United States Patent
Chang et al.

(10) Patent No.: US 8,081,222 B2
(45) Date of Patent: Dec. 20, 2011

(54) PRESSING MECHANISM FOR AN IMAGE SHAKE SUPPRESSING OPTICAL DEVICE

(75) Inventors: Jian-Jun Chang, Dong-Guan (CN); Juan Xu, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 575 days.

(21) Appl. No.: 12/208,496

(22) Filed: Sep. 11, 2008

(65) Prior Publication Data
US 2009/0086037 A1    Apr. 2, 2009

(30) Foreign Application Priority Data
Sep. 28, 2007 (TW) ................ 96136201 A (51) Int. Cl.
*H04N 5/225* (2006.01)
*H04N 5/228* (2006.01)
(52) U.S. Cl. ............... 348/208.4; 348/373; 348/208.99
(58) Field of Classification Search .............. 348/205, 348/373, 374, 208.4, 208.9
See application file for complete search history.

(56) References Cited

U.S. PATENT DOCUMENTS
2009/0002512 A1 * 1/2009 Suzuki et al. ............. 348/222.1
2010/0067887 A1 * 3/2010 Nakai et al. ................. 396/48

FOREIGN PATENT DOCUMENTS
JP           06-141206      * 5/1994
* cited by examiner

*Primary Examiner* — Hung Lam
(74) *Attorney, Agent, or Firm* — Trop, Pruner & Hu, P.C.

(57) ABSTRACT

A pressing mechanism is adapted for use in an image shake suppressing optical device that includes a driving unit and an image capturing unit. The pressing mechanism is adapted to be disposed between the driving unit and the image capturing unit, and includes an arm body and a press head unit. The arm body has a driven end that is adapted to be connected to the driving unit, and a connecting end that is opposite to the driven end. The press head unit is adapted to be disposed between the connecting end of the arm body and the image capturing unit, and is adapted for providing a resilient pressing force on the image capturing unit when the driven end of the arm body is driven by the driving unit to move the connecting end in a pressing direction.

1 Claim, 13 Drawing Sheets

PRESSING MECHANISM FOR AN IMAGE SHAKE SUPPRESSING OPTICAL DEVICE

CROSS-REFERENCE TO RELATED APPLICATION

This application claims priority of Taiwanese Application No. 096136201, filed on Sep. 28, 2007.

BACKGROUND OF THE INVENTION

1. Field of the Invention

The invention relates to a pressing mechanism, more particularly to a pressing mechanism for an image shake suppressing optical device.

2. Description of the Related Art

Figure 1:
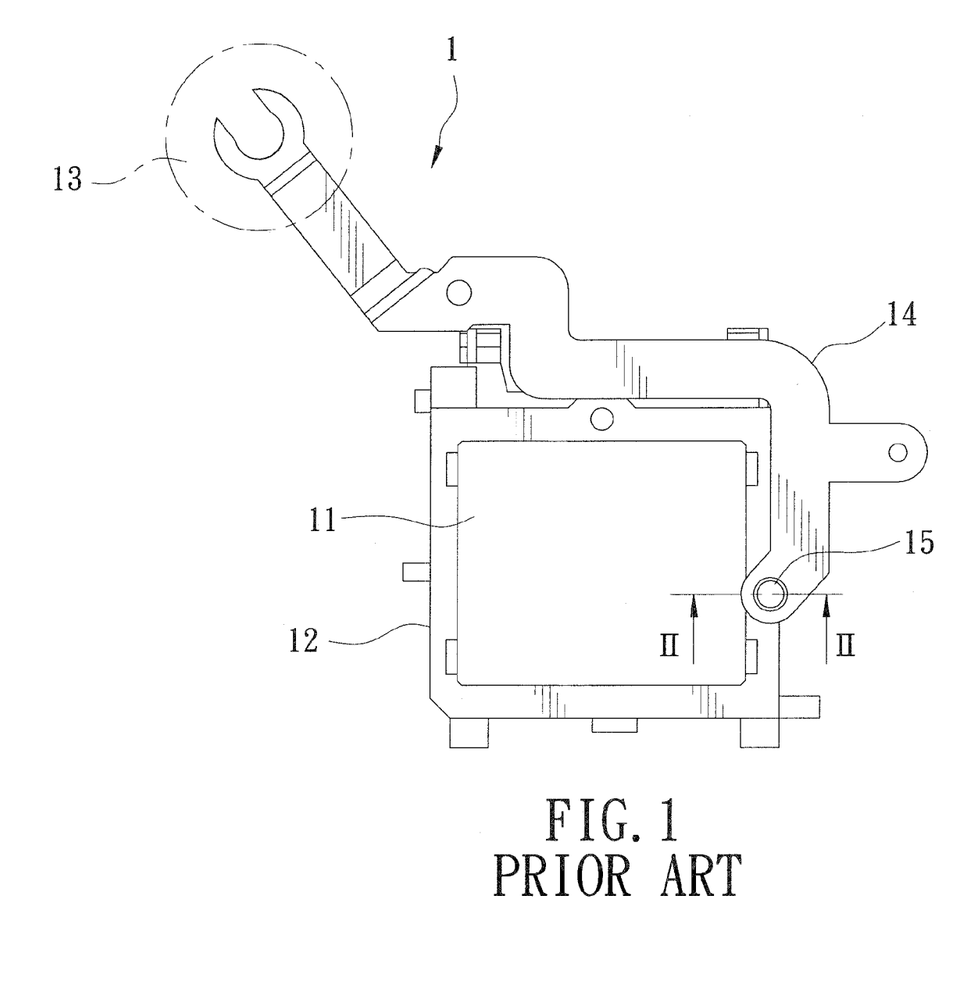
FIG. 1 is a schematic top view of a conventional pressing mechanism for an image shake suppressing optical device.
Figure 2:
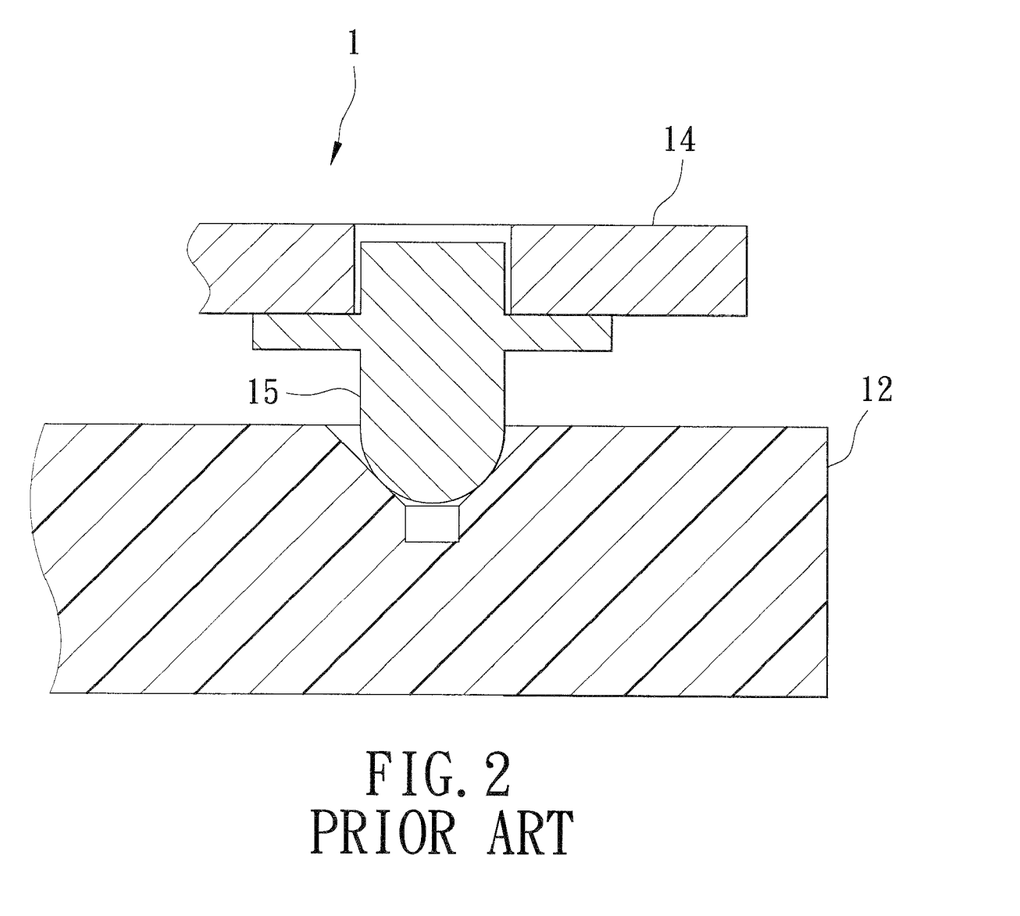
FIG. 2 is a fragmentary sectional view of the conventional pressing mechanism taken along line II-II in FIG. 1.

As shown in FIGS. 1 and 2, a conventional pressing mechanism 1 is disposed in an image shake suppressing optical device, such as a camera. The camera has an image detecting module (not shown) that can drive an image sensing component 11 via a driving circuit (not shown) to move quickly so as to suppress or compensate blurring due to shaking of the camera. After movement of the image sensing component 11, the conventional pressing mechanism 1 presses a mounting frame 12 coupled co-movably to the image sensing component 11, such that the image sensing component 11 can be positioned. The conventional pressing mechanism 1 includes an arm body 14 and a press head 15 coupled to the arm body 14. When the arm body 14 is driven by a driving unit 13 to move one end thereof downwardly, the press head 15 moves along with the arm body 14 to press the mounting frame 12, thereby positioning the image sensing component 11 and avoiding slight vibration of the image sensing component 11.

However, since the press head 15 is rigid and is coupled fixedly to the arm body 14, when the arm body 14 suffers from elastic fatigue and deforms permanently after long-term use, the press head 15 may not able to completely contact and effectively press the mounting frame 12, thereby resulting in possible vibration of the image sensing component 11.

SUMMARY OF THE INVENTION

Therefore, the object of the present invention is to provide a pressing mechanism adapted for use in an image shake suppressing optical device and having a relatively long service life.

Accordingly, a pressing mechanism of the present invention is adapted for use in an image shake suppressing optical device that includes a driving unit and an image capturing unit. The pressing mechanism is adapted to be disposed between the driving unit and the image capturing unit, and comprises an arm body and a press head unit. The arm body has a driven end that is adapted to be connected to the driving unit of the image shake suppressing optical device, and a connecting end that is opposite to the driven end. The press head unit is adapted to be disposed between the connecting end of the arm body and the image capturing unit of the image shake suppressing optical device, and is adapted for providing a resilient pressing force on the image capturing unit when the driven end of the arm body is driven by the driving unit to move the connecting end in a pressing direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
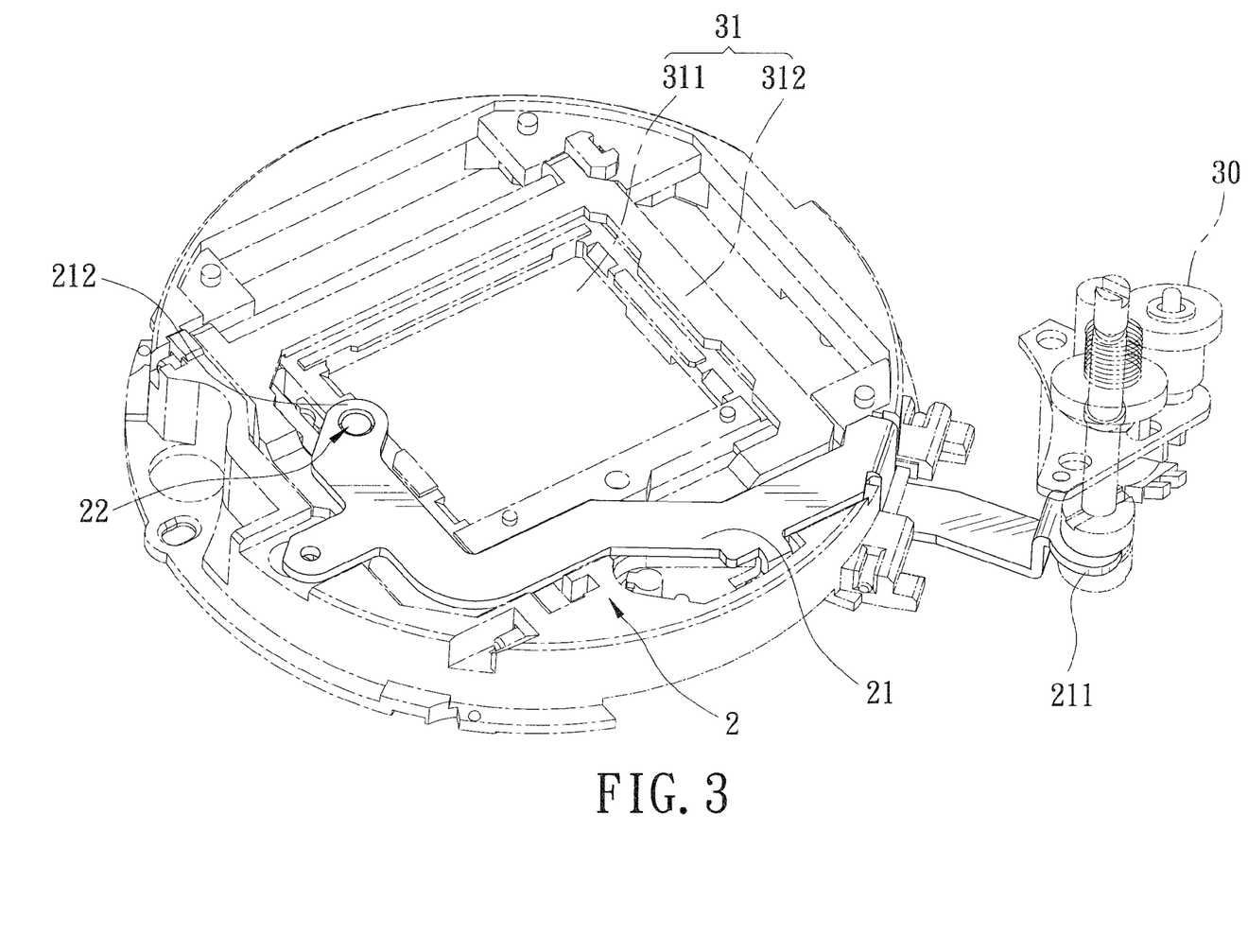
FIG. 3 is a perspective view of a first preferred embodiment of a pressing mechanism for an image shake suppressing optical device according to the invention.
Figure 4:
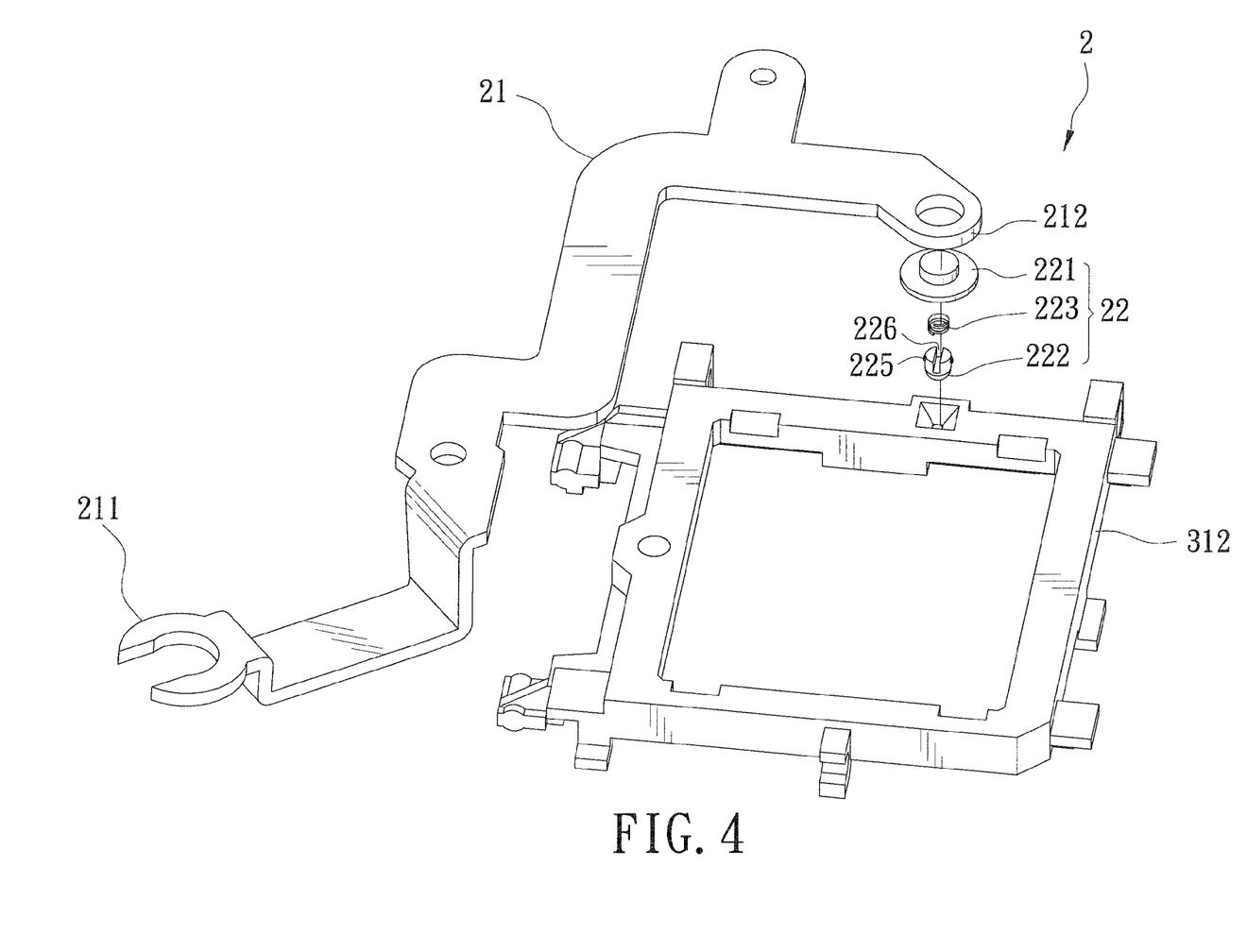
FIG. 4 is an exploded perspective view of the first preferred embodiment and a mounting frame of an image capturing unit of the image shake suppressing optical device.
Figure 5:
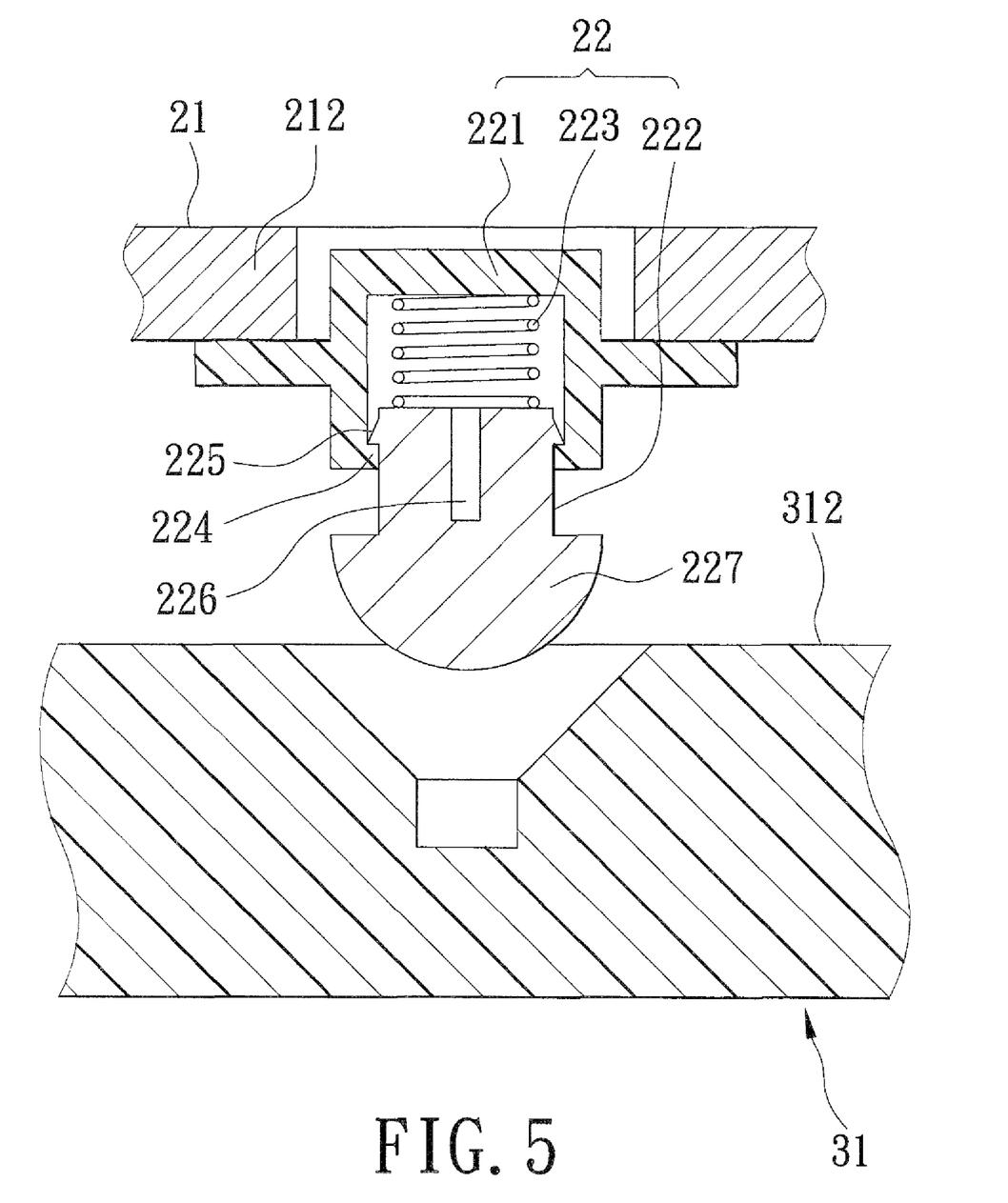
FIG. 5 is a fragmentary sectional view of the first preferred embodiment, illustrating a press head unit moved away from the mounting frame.

As shown in FIGS. 3 to 5, the first preferred embodiment of a pressing mechanism 2 according to the present invention is adapted for use in an image shake suppressing optical device, such as a camera (not shown). The camera includes a driving unit 30 and an image capturing unit 31. The image capturing unit 31 includes an image sensing component 311 and a mounting frame 312 on which the image sensing component 311 is mounted, and can be driven by a driving circuit (not shown) to move in a conventional manner to compensate blurring due to vibration of the camera. The pressing mechanism is disposed between the driving unit 30 and the image capturing unit 31, and comprises an arm body 21 and a press head unit 22.

The arm body 21 has a driven end 211 that is adapted to be connected to the driving unit 30 of the image shake suppressing optical device, and a connecting end 212 that is opposite to the driven end 211.

The press head unit 22 is adapted to be disposed between the connecting end 212 and the mounting frame 312 of the image capturing unit 31 of the image shake suppressing optical device, and is adapted for providing a resilient pressing force on the mounting frame 312 of the image capturing unit 31 of the image shake suppressing optical device. In this embodiment, the press head unit 22 includes a mounting seat 221 mounted on the connecting end 212 of the arm body 21, a press head 222 coupled movably to the mounting seat 221 and adapted for applying the resilient pressing force on the mounting frame 312 of the image capturing unit 31, and a resilient component 223 disposed between the mounting seat 221 and the press head 222. In this embodiment, the resilient component 223 is a compression spring. Preferably, as best shown in FIG. 5, the mounting seat 221 has a head limiting portion 224, and the press head 222 has a contact portion 227 adapted for contacting the mounting frame 312 of the image capturing unit 31, a pair of hook members 225 coupled movably to the mounting seat 221, and a groove 226 formed between the hook members 225. The hook members 225 are engageable with the head limiting portion 224 to prevent separation of the press head 222 from the mounting seat 221.

Figure 6:
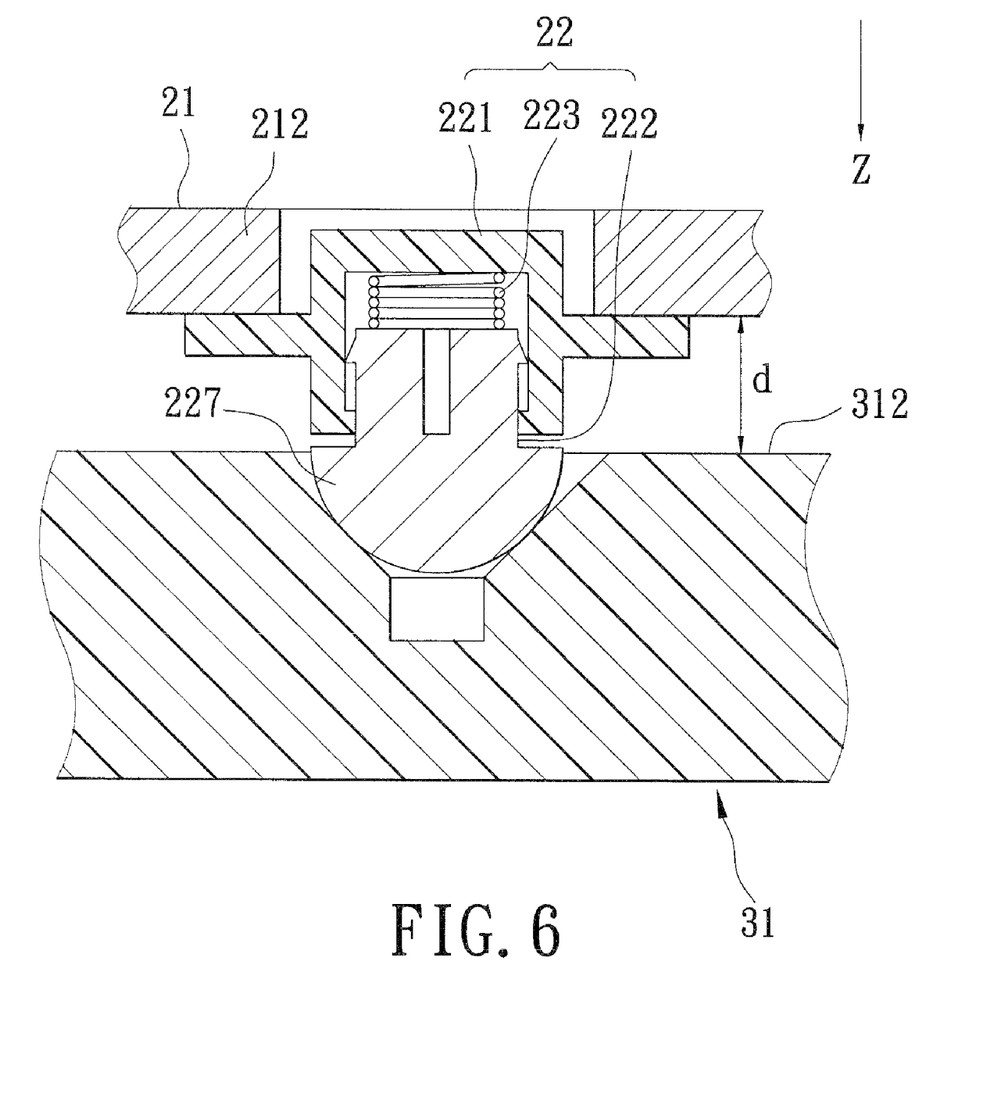
FIG. 6 is another fragmentary sectional view of the first preferred embodiment, illustrating the press head unit pressing the mounting frame.

When the camera is in use, the image capturing unit 31 moves to compensate the blurring due to vibration of the camera in a conventional manner. Afterward, referring to FIGS. 3 and 6, the driving unit 30 is actuated such that the driven end 211 of the arm body 21 is driven by the driving unit 30 to move the connecting end 212 of the arm body 21 in a pressing direction (Z) for a predetermined distance. At that time, the contact portion 227 of the press head 222 of the press head unit 22 is biased to press the mounting frame 312 of the image capturing unit 31 to thereby position the image capturing unit 31, and the resilient component 223 of the press head unit 22 is compressed such that the press head unit 22 fits in an ideal distance (d) between the connecting end 212 of the arm body 21 and the mounting frame 312.

On the contrary, when the driven end 211 of the arm body 21 is driven by the driving unit 30 to move the connecting end 212 of the arm body 21 back to an initial position (see FIG. 5), the press head 222 of the press head unit 22 is separated from the mounting frame 312, thereby permitting movement of the image capturing unit 31 for blurring compensation.

Figure 7:
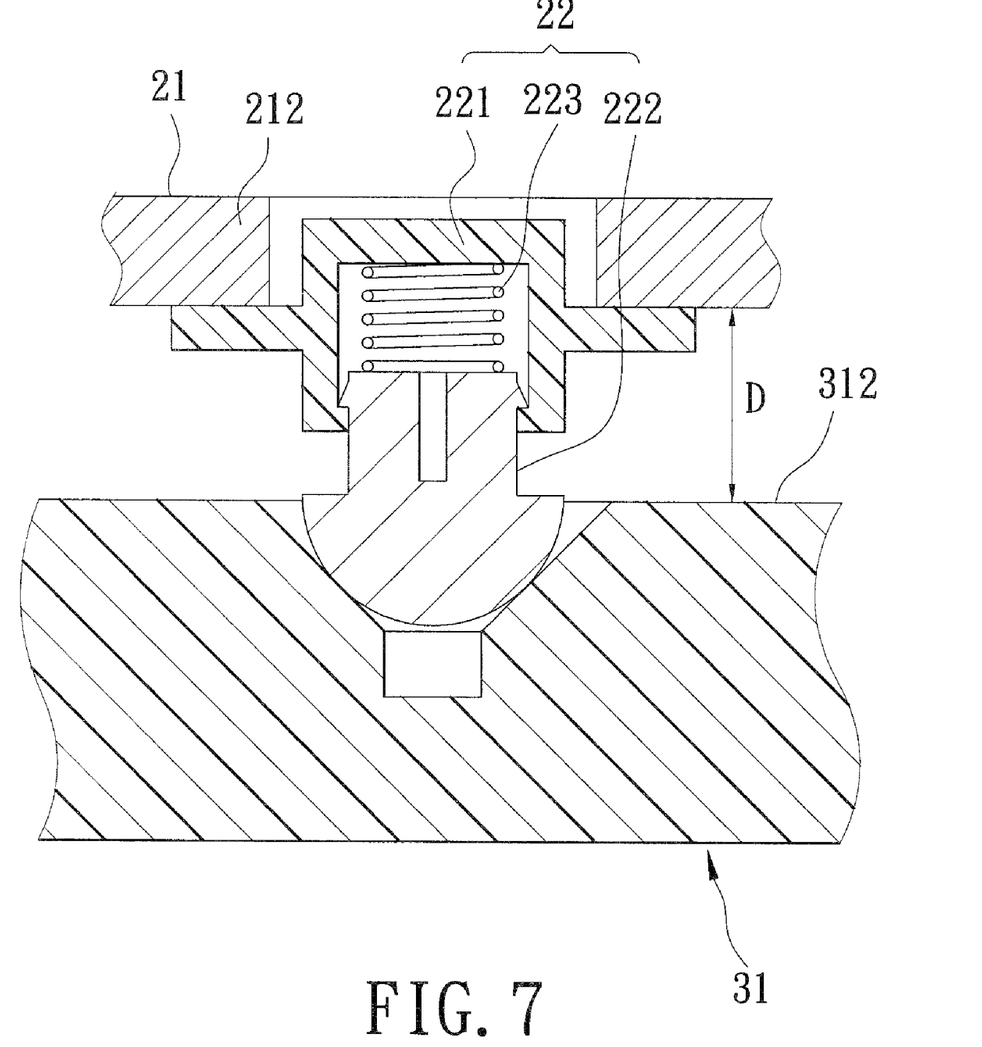
FIG. 7 is a view similar to FIG. 6, but illustrating the press head unit pressing the mounting frame when a distance between an arm body and the mounting frame is larger.

As shown in FIGS. 3 and 7, after long-term use, the arm body 21 will deform permanently, thereby resulting in a larger distance (D) between the connecting end 212 of the arm body 21 and the mounting frame 312 after the connecting end 212 is moved in the pressing direction (Z) in the aforementioned manner. However, by virtue of the resilient component 223, the press head unit 22 can still fit in the distance (D) and be biased to press firmly the mounting frame 312 of the image capturing unit 31. Therefore, the pressing mechanism 2 has a longer service life than that of the prior art.

Figure 8:
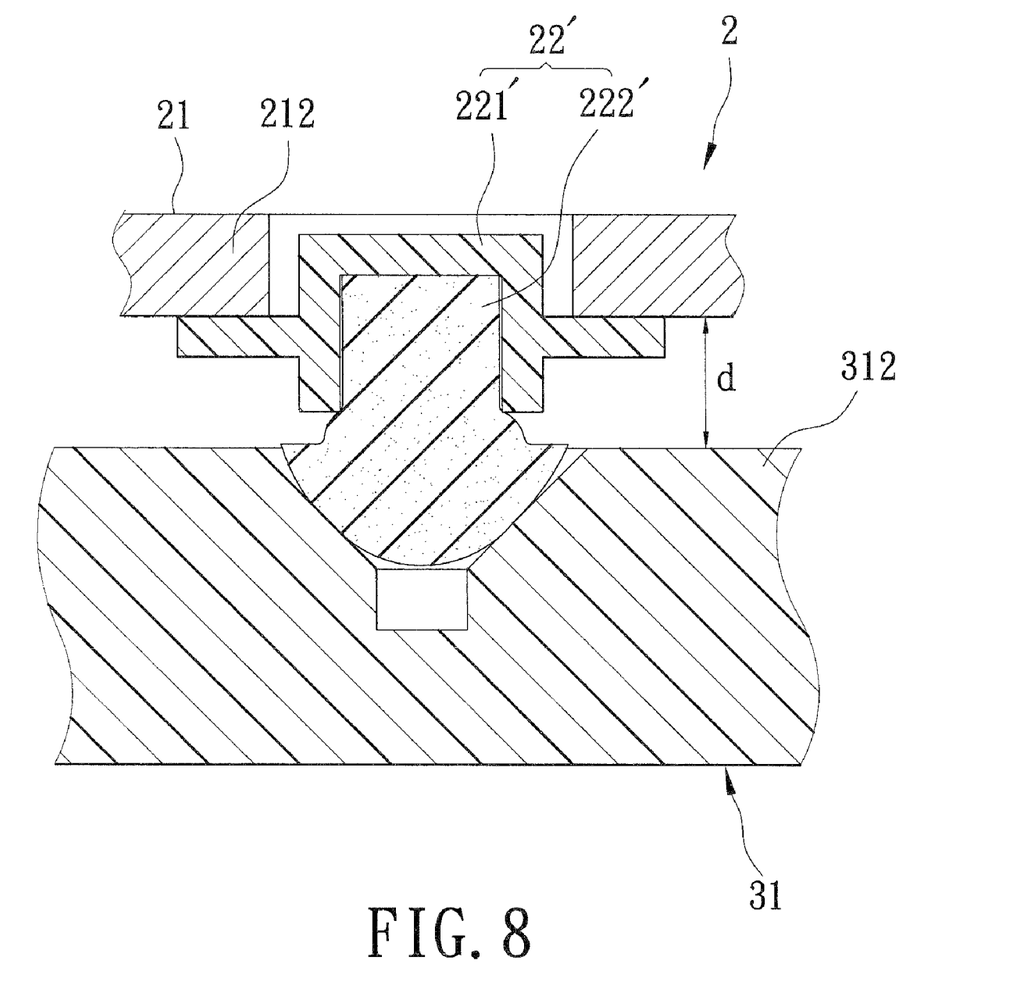
FIG. 8 is a fragmentary sectional view of a second preferred embodiment of the pressing mechanism according to the invention, illustrating a press head unit pressing the mounting frame.
Figure 9:
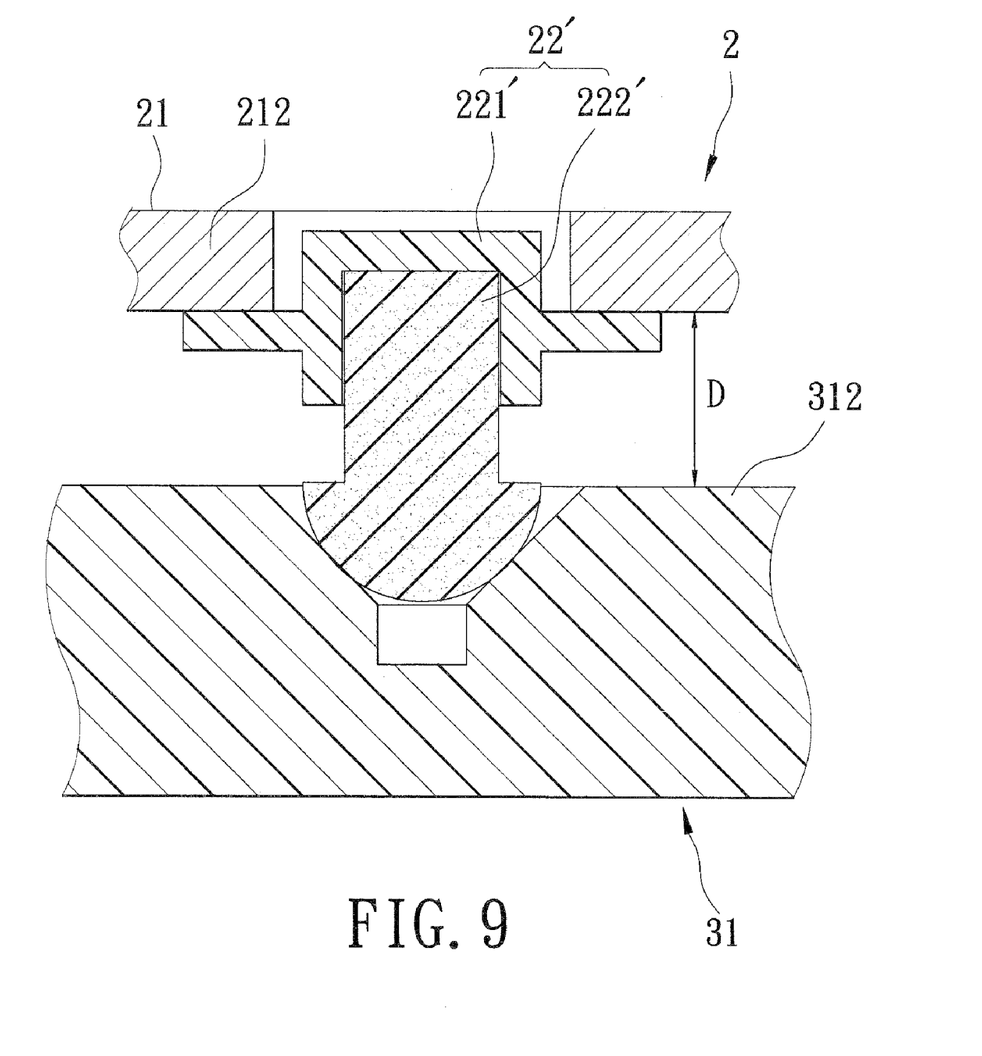
FIG. 9 is a view similar to FIG. 8, but illustrating the press head unit pressing the mounting frame when a distance between an arm body and the mounting frame is larger.

As shown in FIGS. 3, 8, and 9, the second preferred embodiment of the pressing mechanism 2 according to the present invention has a structure similar to that of the first embodiment. The main difference between this embodiment and the previous embodiment resides in the following. In this embodiment, the pressing mechanism 2 has a press head unit 22' that includes a mounting seat 221' mounted on the connecting end 212 of the arm body 21, and a press head 222' mounted to the mounting seat 221' and adapted for applying the resilient pressing force on the image capturing unit 31. The press head 222' is made of a resilient material, such as rubber, silica gel, sponge, or foam rubber, and is suitable for absorbing slight vibration of the image capturing unit 31. The second preferred embodiment has the same advantages as those of the first preferred embodiment.

It should be noted that the press head units 22, 22' of the first and second preferred embodiments may be mounted to the mounting frame 312 of the image capturing unit 31 instead of the connecting end 212 of the arm body 21, and can be pressed by the connecting end 212 of the arm body 21 to achieve the same effect in other embodiments of the invention.

Figure 10:
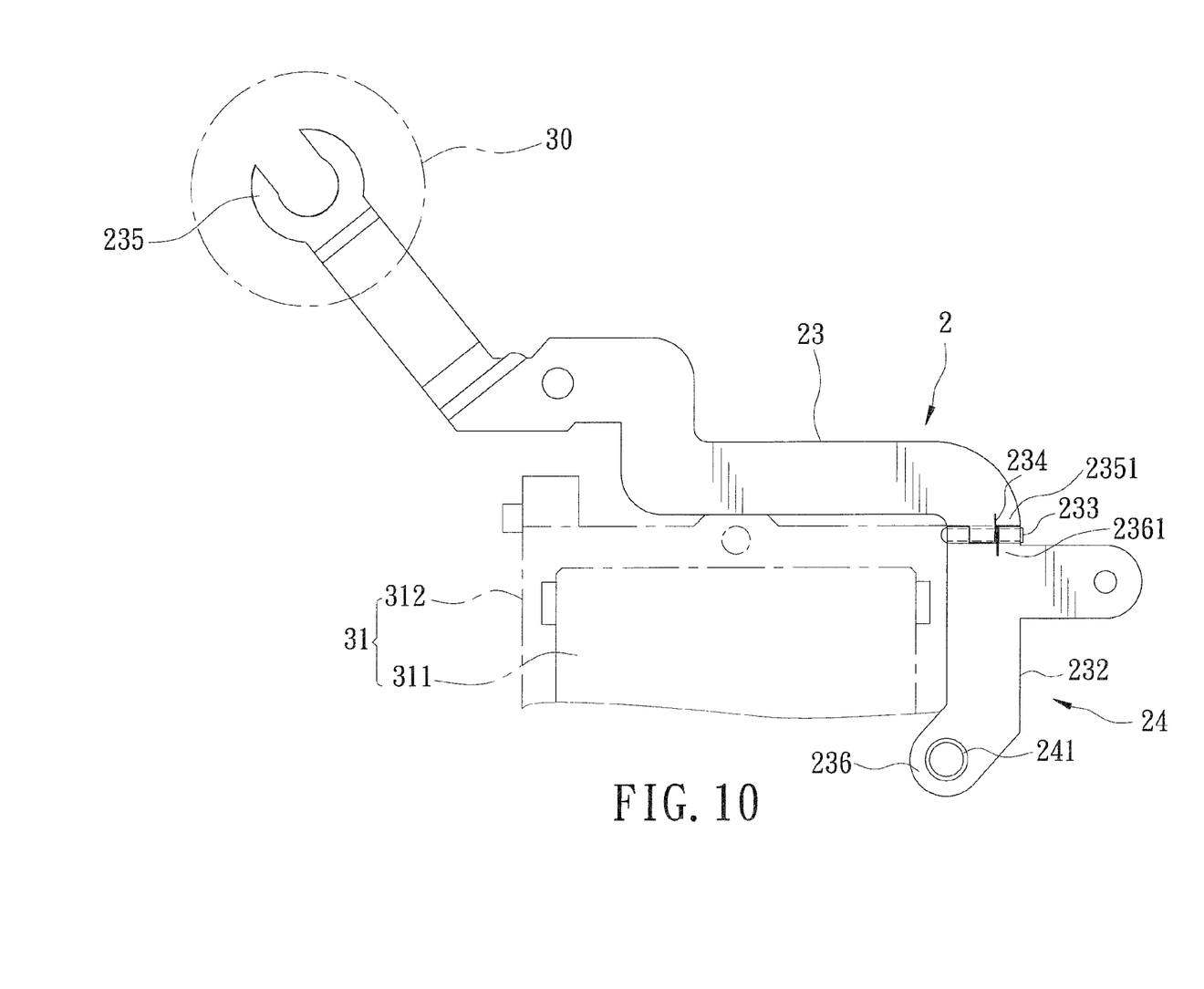
FIG. 10 is a schematic top view of a third preferred embodiment of the pressing mechanism according to the invention.
Figure 11:
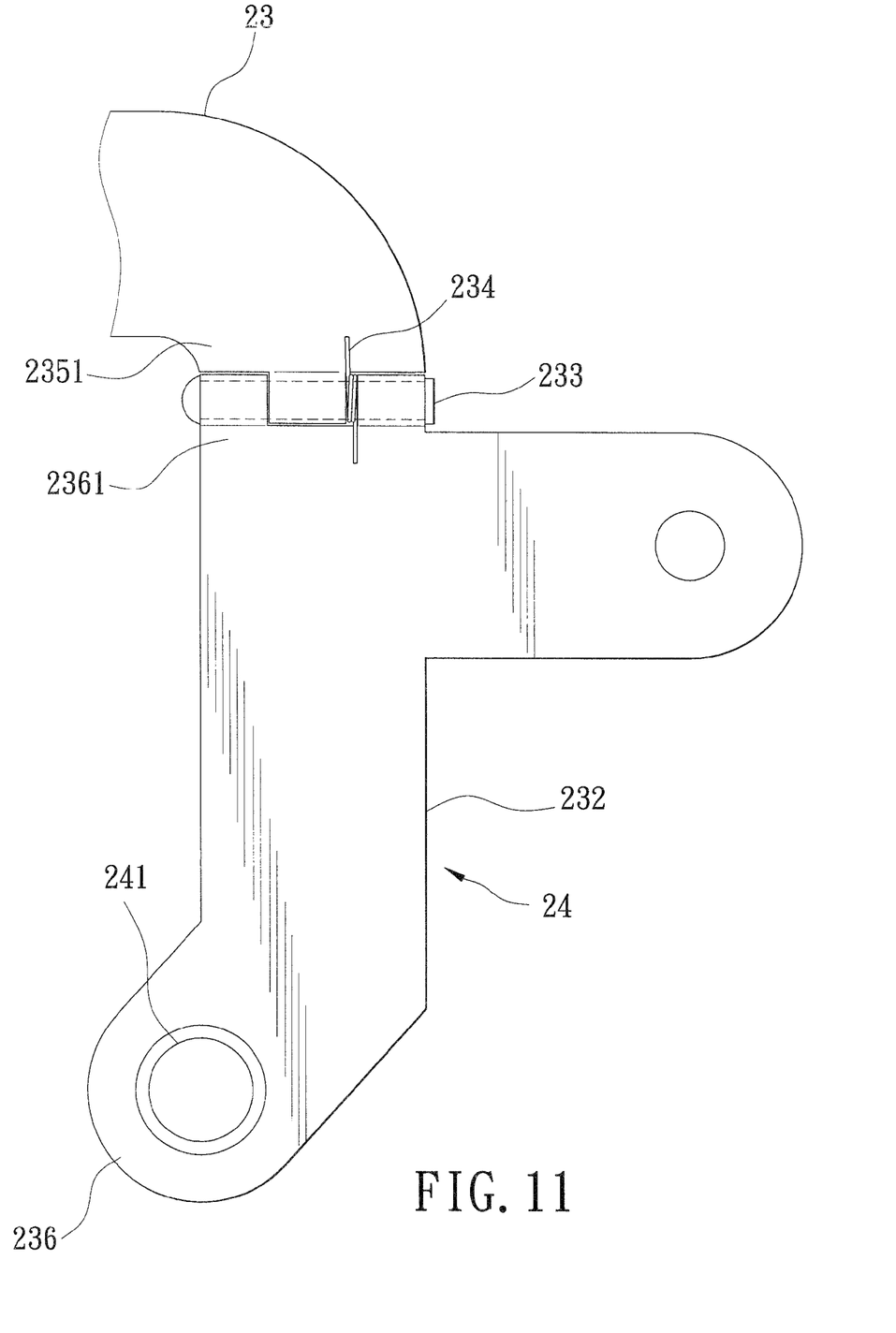
FIG. 11 is an enlarged fragmentary schematic top view of the third preferred embodiment.

As shown in FIGS. 10 and 11, the third preferred embodiment of the pressing mechanism 2 according to the present invention has a structure similar to that of the first preferred embodiment. The main difference between this embodiment and the first preferred embodiment resides in the following. In this embodiment, the pressing mechanism 2 has an arm body 23, a press head unit 24, and a pivot pin 233. The arm body 23 has a driven end 235 adapted to be connected to the driving unit 30 of the image shake suppressing optical device, and a connecting end 2351 opposite to the driven end 235. As further shown in FIGS. 12 and 13, the press head unit 24 includes a pivot segment 232 that has a pivot end 2361 pivotally connected to the connecting end 2351 of the arm body 23 and a press end 236 opposite to the pivot end 2361, a restoring member 234 that has opposite ends respectively acting on the arm body 23 and the pivot segment 232, and a press head 241 that is mounted to the press end 236 of the pivot segment 232 and that is adapted for applying the resilient pressing force on the mounting frame 312 of the image capturing unit 31. The pivot pin 233 interconnects pivotally the ends 2351, 2361 of the arm body 23 and the pivot segment 232.

Figure 12:
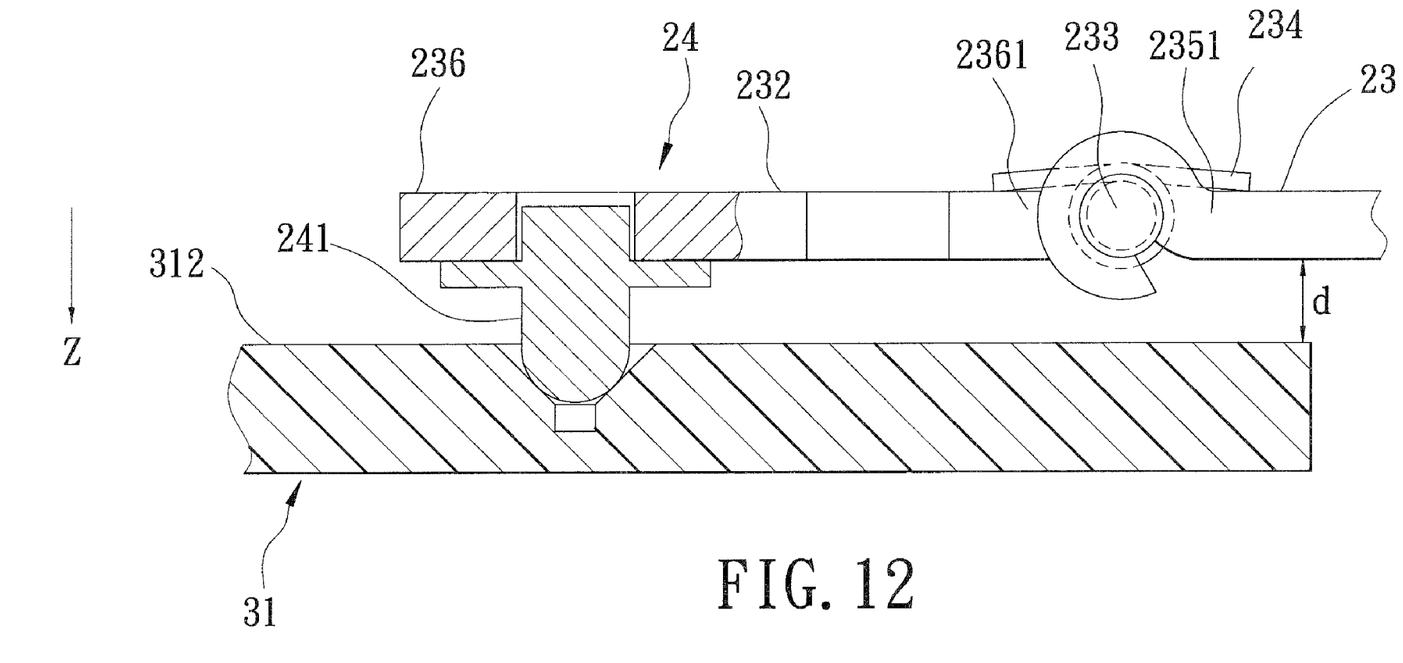
FIG. 12 is a fragmentary sectional view of the third preferred embodiment, illustrating a press head unit pressing the mounting frame.
Figure 13:
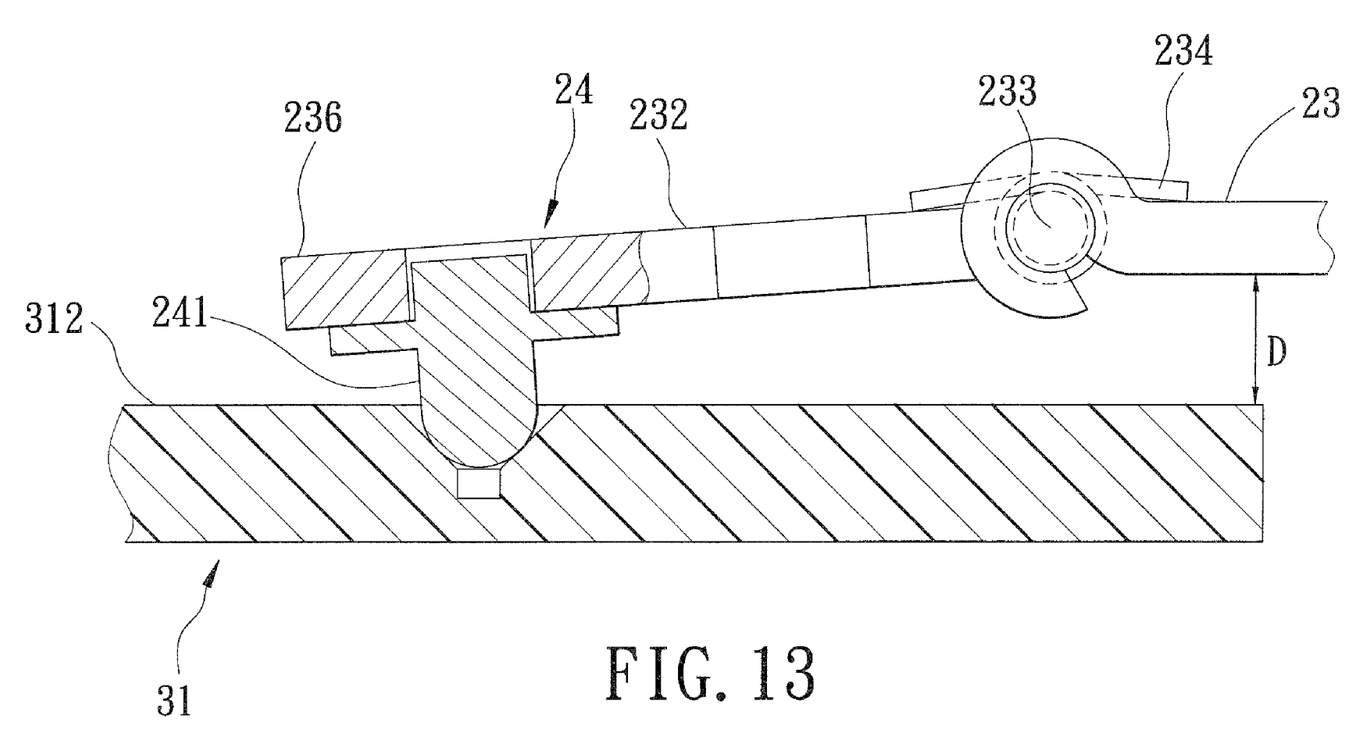
FIG. 13 is a view similar to FIG. 12, but illustrating the press head unit pressing the mounting frame when a distance between an arm body and the mounting frame is larger.

In this embodiment, the restoring member 234 is a torsion spring and is disposed between the connecting end 2351 of the arm body 23 and the pivot end 2361 of the pivot segment 232. As shown in FIG. 12, when the driven end 235 of the arm body 23 is driven by the driving unit 30 to move the connecting end 2351 of the arm body 23 in the pressing direction (Z) such that a distance (d) is formed between the arm body 23 and the mounting frame 312 of the image capturing unit 31, the resilient force of the restoring component 234 biases the pivot segment 232 to pivot in the pressing direction (Z) relative to the arm body 23, thereby pressing the press head 241 against the mounting frame 312 of the image capturing unit 31. After long-term use, the deformation of the arm body 23 results in a larger distance (D) between the arm body 23 and the mounting frame 312 after the arm body 23 is driven to move in the aforementioned manner, as best shown in FIG. 13. Even so, the resilient force of the restoring component 234 can still bias the pivot segment 232 to pivot to a greater extent to press firmly the press head 241 against the mounting frame 312. The third preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pressing mechanism adapted for use in an image shake suppressing optical device that includes a driving unit and an image capturing unit, said pressing mechanism being adapted to be disposed between the driving unit and the image capturing unit and comprising:

an arm body having a driven end that is adapted to be connected to the driving unit of the image shake suppressing optical device, and a connecting end that is opposite to said driven end; and a press head unit adapted to be disposed between said connecting end of said arm body and the image capturing unit of the image shake suppressing optical device and adapted for providing a resilient pressing force on the image capturing unit when said driven end of said arm body is driven by the driving unit to move said connecting end in a pressing direction;

wherein said press head unit includes
a mounting seat mounted on said connecting end of said arm body, and
a press head made of a resilient material less rigid than said mounting seat, mounted to said mounting seat, and adapted for applying the resilient pressing force on the image capturing unit.

* * * * *